United States Patent
Luo et al.

(10) Patent No.: US 8,834,689 B2
(45) Date of Patent: Sep. 16, 2014

(54) DEVICE, APPARATUS, AND METHOD FOR ABRASIVE ELECTROCHEMICAL FINISHING

(75) Inventors: Yuefeng Luo, Mechanicville, NY (US); William Edward Adis, Scotia, NY (US); Hrishikesh Vishvas Deo, Saratoga Springs, NY (US)

(73) Assignee: General Electric Company, Schenectady, NY (US)

(*) Notice: Subject to any disclaimer, the term of this patent is extended or adjusted under 35 U.S.C. 154(b) by 726 days.

(21) Appl. No.: 13/044,765

(22) Filed: Mar. 10, 2011

(65) Prior Publication Data

US 2012/0228153 A1  Sep. 13, 2012

(51) Int. Cl.
| | |
|---|---|
| B23B 5/08 | (2006.01) |
| B23B 9/02 | (2006.01) |
| B24B 19/26 | (2006.01) |
| B24B 41/06 | (2012.01) |
| B24B 1/00 | (2006.01) |
| B23H 5/08 | (2006.01) |
| B23H 9/02 | (2006.01) |

(52) U.S. Cl.
CPC ...... *B24B 1/002* (2013.01); *B23H 5/08* (2013.01); *B24B 41/06* (2013.01); *B23H 9/02* (2013.01)
USPC .......... 204/297.14; 204/297.01; 204/297.05; 205/663

(58) Field of Classification Search
CPC ....... B24B 1/002; B24B 41/06; B23H 11/003
USPC ...................... 204/297.01–297.16
See application file for complete search history.

(56) References Cited

U.S. PATENT DOCUMENTS

| | | | |
|---|---|---|---|
| 5,833,702 A | 11/1998 | Van Wyk et al. | |
| 2010/0176556 A1* | 7/2010 | Mack et al. | 277/411 |

* cited by examiner

*Primary Examiner* — Nicholas A Smith
(74) *Attorney, Agent, or Firm* — Hoffman Warnick LLC; Ernest G. Cusick

(57) ABSTRACT

A device, apparatus, and method for abrasive electrochemical finishing of an arc flange leaf pack are presented. The device includes: a concave support block having holes to receive securing members; removable first and second end blocks configured to seat at opposite ends of the concave support block; removable first and second face plates attached to opposite sides of the concave support block via the securing members; and a region of space between the removable first and second face plates, the removable first and second end blocks, and the concave support block.

4 Claims, 14 Drawing Sheets

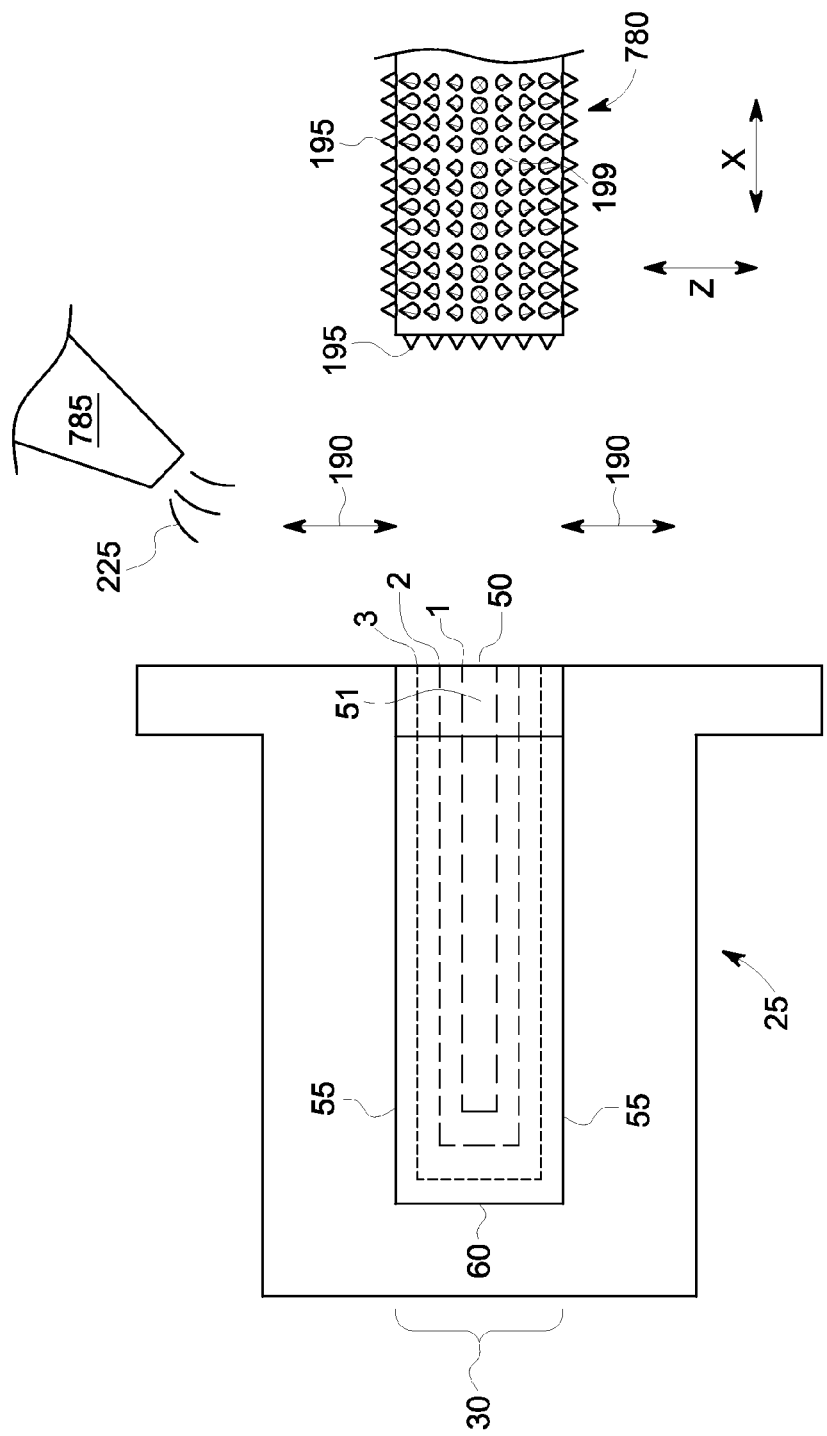

DEVICE, APPARATUS, AND METHOD FOR ABRASIVE ELECTROCHEMICAL FINISHING

BACKGROUND OF THE INVENTION

The invention relates generally to electrochemical finishing. More particularly, the invention relates to devices, apparatuses, and methods for abrasive electrochemical finishing of arc flange leaf segments of a compliant seal.

A compliant seal typically consists of arc flange leaf segments that are placed around a steam turbine rotor of a turbomachine. The leaf segments are placed such that a small clearance between tips of leaves of the leaf segments and the steam turbine rotor can be maintained for minimum steam leakage. The arc flange leaf segments do not contact the steam turbine rotor and are close sealing. Prior to placement around the steam turbine rotor, the leaf segments are machined, i.e., finished, to meet the small clearance.

BRIEF DESCRIPTION OF THE INVENTION

A first aspect of the disclosure provides a resilient clamping device comprising: a concave support block having holes to receive securing members; removable first and second end blocks configured to seat at opposite ends of the concave support block; removable first and second face plates attached to opposite sides of the concave support block via the securing members; and a region of space between the removable first and second face plates, the removable first and second end blocks, and the concave support block.

A second aspect of the disclosure provides a resilient clamping device comprising: a convex support block having holes to receive securing members; removable first and second end blocks configured to seat at opposite ends of the convex support block; removable first and second cover plates configured to seat on the removable first and second end blocks respectively; removable first and second face plates attached to opposite sides of the convex support block via the securing members; and a region of space between the removable first and second face plates, the removable first and second end blocks, and the convex support block.

A third aspect of the disclosure provides a method for abrasive electrochemical finishing of an arc flange leaf segment, the method comprising: constraining the arc flange leaf segment in a first resilient clamping device; finishing leaf tips of the arc flange leaf segment with an electrochemical grinding machine; removing the arc flange leaf segment from the first resilient clamping device and constraining the arc flange leaf segment in a second resilient clamping device; and finishing leaves of the arc flange leaf segment with the electrochemical grinding machine.

A fourth aspect of the disclosure provides an apparatus for abrasive electrochemical finishing of an arc flange leaf segment, the apparatus comprising: a resilient clamping device, the device including: a concave support block having holes to receive securing members; removable first and second end blocks configured to seat at opposite ends of the concave support block; removable first and second face plates attached to opposite sides of the concave support block via the securing members; and a region of space between the removable first and second face plates, the removable first and second end blocks, and the concave support block; an electrochemical grinding machine for finishing the arc flange leaf segment; and a control system coupled to the electrochemical grinding machine, the control system configured to control the grinding machine during finishing of the arc flange leaf segment.

A fifth aspect of the disclosure provides an apparatus for abrasive electrochemical finishing of an arc flange leaf segment, the apparatus comprising: a resilient clamping device, the device including: a convex support block having holes to receive securing members; removable first and second end blocks configured to seat at opposite ends of the convex support block; removable first and second cover plates configured to seat on the removable first and second end blocks respectively; removable first and second face plates attached to opposite sides of the convex support block via the securing members; and a region of space between the removable first and second face plates, the removable first and second end blocks, and the convex support block; an electrochemical grinding machine for finishing the arc flange leaf segment; and a control system coupled to the electrochemical grinding machine, the control system configured to control the grinding machine during finishing of the arc flange leaf segment.

A sixth aspect of the disclosure provides an apparatus for abrasive electrochemical finishing of an arc flange leaf segment, the apparatus comprising: a resilient clamping device, the device including: a convex support block having holes to receive securing members; removable first and second end blocks configured to seat at opposite ends of the convex support block; removable first and second cover plates configured to seat on the removable first and second end blocks respectively; removable first and second face plates attached to opposite sides of the convex support block via the securing members; and a region of space between the removable first and second face plates, the removable first and second end blocks, and the convex support block; an electrochemical grinding table including at least one conductive grinding arm for finishing the arc flange leaf segment; and a control system coupled to the device and the electrochemical grinding table, the control system configured to control the movement of a rotary table of the device and the conductive grinding arm of the electrochemical grinding table during finishing of the arc flange leaf segment.

A seventh aspect of the disclosure provides a method for abrasive electrochemical finishing of an arc flange leaf segment, the method comprising: constraining the arc flange leaf segment in a first resilient clamping device; finishing tips of the arc flange leaf segment with an electrochemical grinding machine; removing the arc flange leaf segment from the first resilient clamping device and constraining the arc flange leaf segment in a second resilient clamping device; constraining the arc flange leaf segment in the second resilient clamping device on an electrochemical grinding table; and finishing leaves of the arc flange leaf segment with the electrochemical grinding table.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 14 shows another partial, side view of abrasive electrochemical finishing of an arc flange leaf segment, in accordance with an embodiment of the present invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

An arc flange leaf segment may be formed by stacking and welding leaf segments to an arc flange. After the leaf segments are stacked and welded to form the arc flange leaf segment, leaf tips and an inside core of the leaf segment are machined/finished to a predetermined tolerance. Electrical discharge machining (EDM), wire EDM, and electrochemical grinding (ECG) have been used to finish the leaf tips and inside core. However, EDM may typically leave debris stuck between the leaf pack leaves and have a low leaf cutting speed while ECG may crush the leaves. Due to the flexible nature of the leaf segments, finishing arc flange leaf segments presents a number of challenges.

Figure 1:
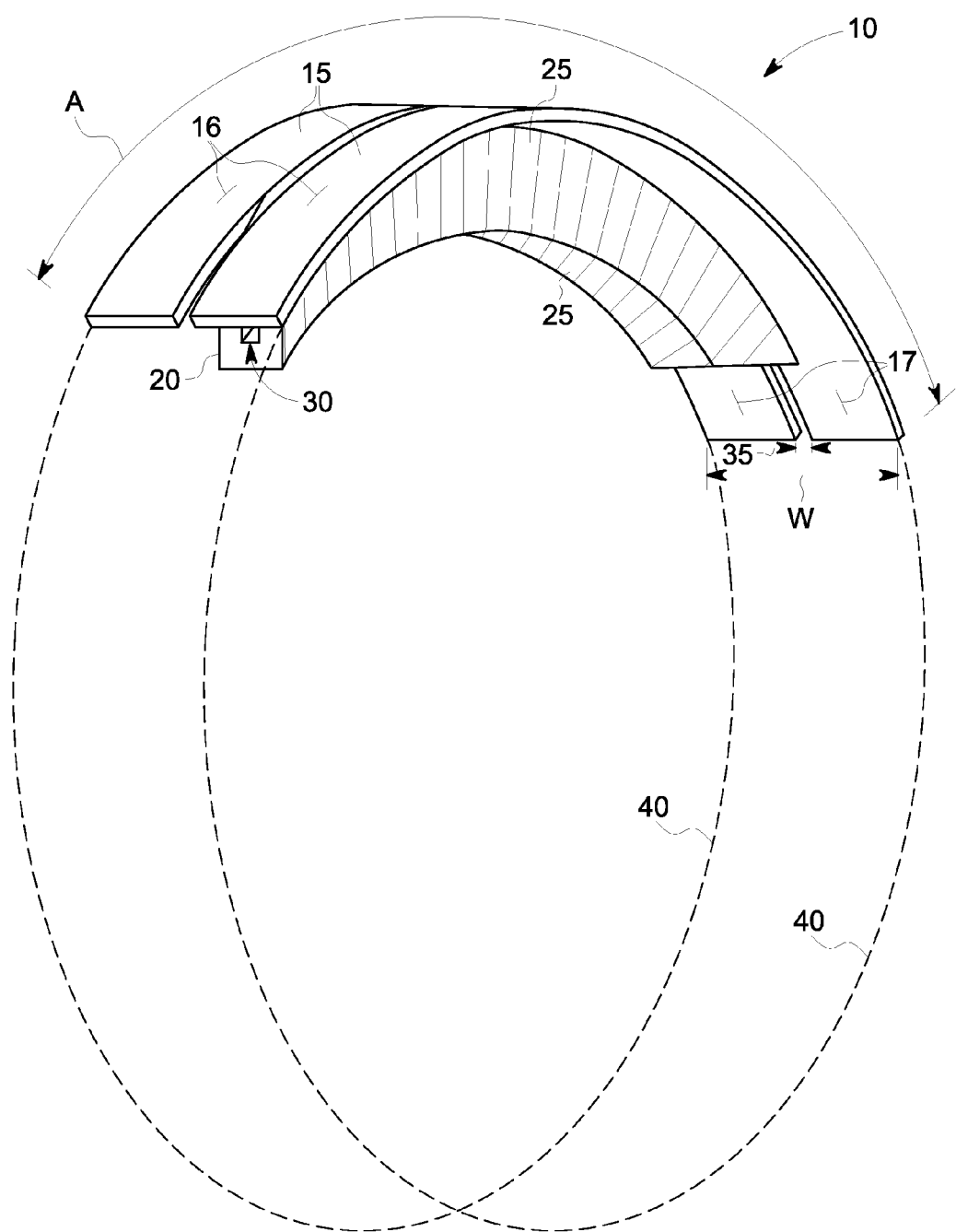
FIG. 1 shows a schematic view of an arc flange leaf pack in accordance with an embodiment of the present invention.

Referring to FIG. 1, a schematic illustration of an arc flange leaf segment 10 is shown according to an embodiment of the present invention. Arc flange leaf pack 10 may include a pair of arc flanges 15 to hold leaf segment 20. Leaf segment 20 may also include a plurality of leaves 25 and a leaf slot 30 running therethrough. Leaves 25 may be stacked on top of each other and welded to arc flanges 15 such that leaf slot 30 is aligned with an arc flange slot 35 that runs between and the entire length of arc flanges 15. Arc flanges 15 may include a top surface 16 and a bottom surface 17. Leaf segment 20 may include approximately 1,000 leaves to approximately 3,000 leaves 25. In an embodiment, leaf segment 20 may include approximately 2,000 leaves 25.

The length of arc flange leaf segment 10 may be defined by an arc A which may be a partial circumference of a circle 40 formed when a plurality of arc flange leaf segments 10 are assembled to surround a steam turbine rotor (not shown). For example, arc A may have a length in a range of approximately 20 cm to approximately 50 cm. In an embodiment, arc A may be 35.5 cm. Width W of arc flange leaf segment 10 may be in a range of approximately 3.8 cm to approximately 15 cm. In an embodiment, width W may be approximately 8 cm.

Figure 2:
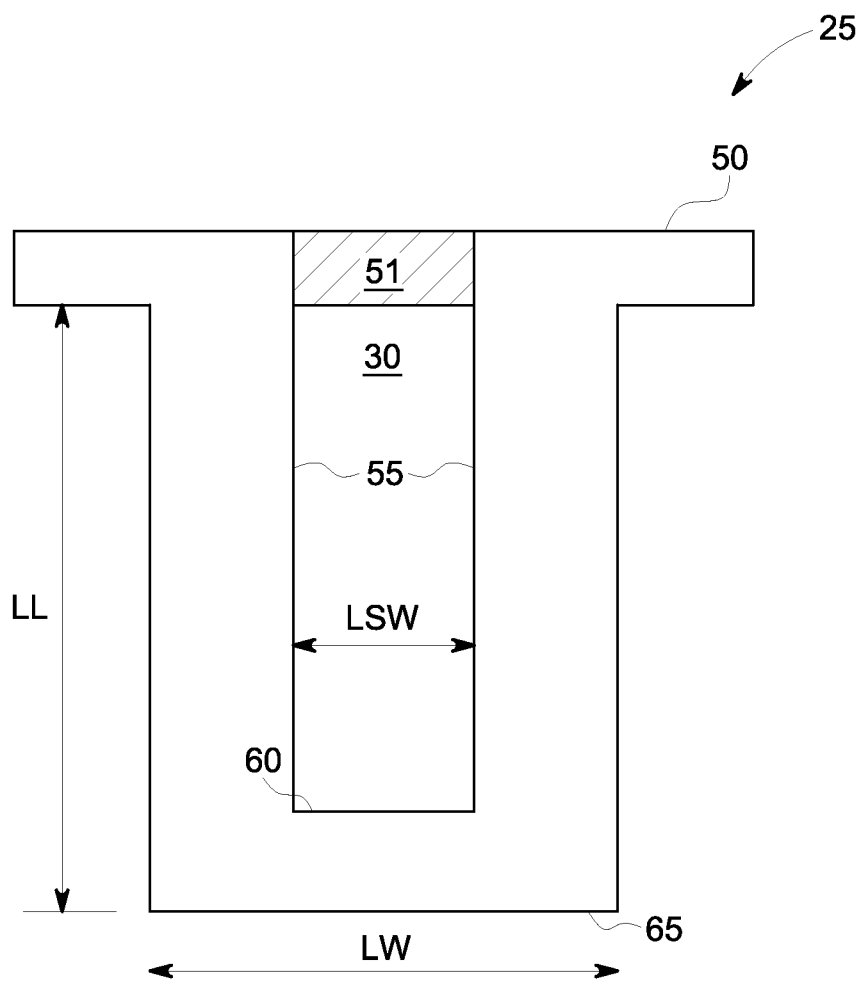
FIG. 2 shows a partial, cross-sectional view of a leaf of an arc flange leaf segment, in accordance with an embodiment of the present invention.

Referring to FIG. 2, a cross-sectional illustration of a single leaf 25 is shown according to an embodiment of the present invention. Leaf 25 may include a top 50, leaf slot sides 55, a leaf slot bottom 60, and a leaf tip 65. Leaf 25 may also include a top section 51 that may be present prior to finishing of arc flange leaf segment 10. Leaf 25 may have a length LL from top section 50 to leaf tip 65. Length LL may be in a range from approximately 4 cm to approximately 8 cm. In an embodiment, length LL may be 5 cm. Leaf 25 may have a width LW. Width LW may be in a range from approximately 1.8 cm to approximately 5 cm. In an embodiment, LW may be approximately 2.5 cm. Leaf slot 30 may have a width LSW in a range from approximately 0.4 cm to approximately 0.8 cm. In an embodiment, LSW may be approximately 0.64 cm.

Referring to FIGS. 3-6, a partial, cross-sectional view and a side view illustration of an apparatus 100 for abrasive electrochemical finishing of an arc flange leaf segment 10, and a schematic side view illustration of arc flange leaf segment 10 are shown according to an embodiment of the present invention. Apparatus 100 may include a resilient clamping device 130. Also shown is arc flange leaf segment 10 constrained in resilient clamping device 130. Various embodiments of arc flange leaf segment 10 have been previously described.

Figure 3:
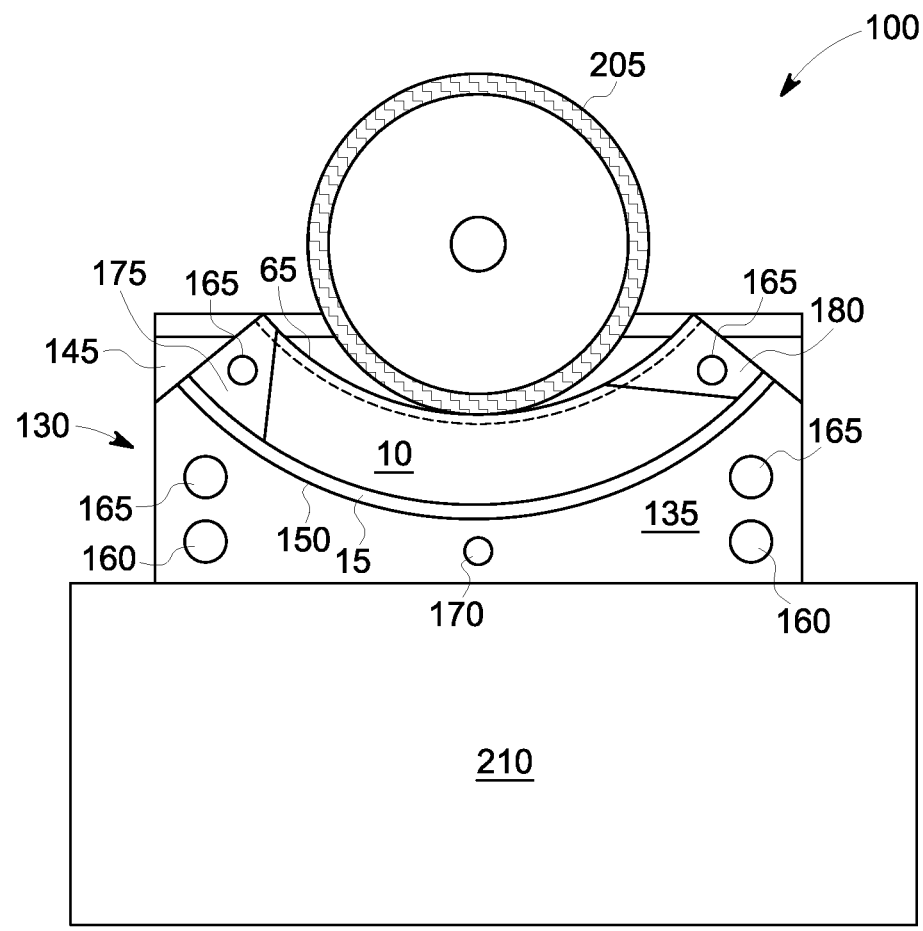
FIG. 3 shows a partial, cross-sectional schematic view of an apparatus for abrasive electrochemical finishing of an arc flange leaf segment, in accordance with an embodiment of the present invention.
Figure 4:
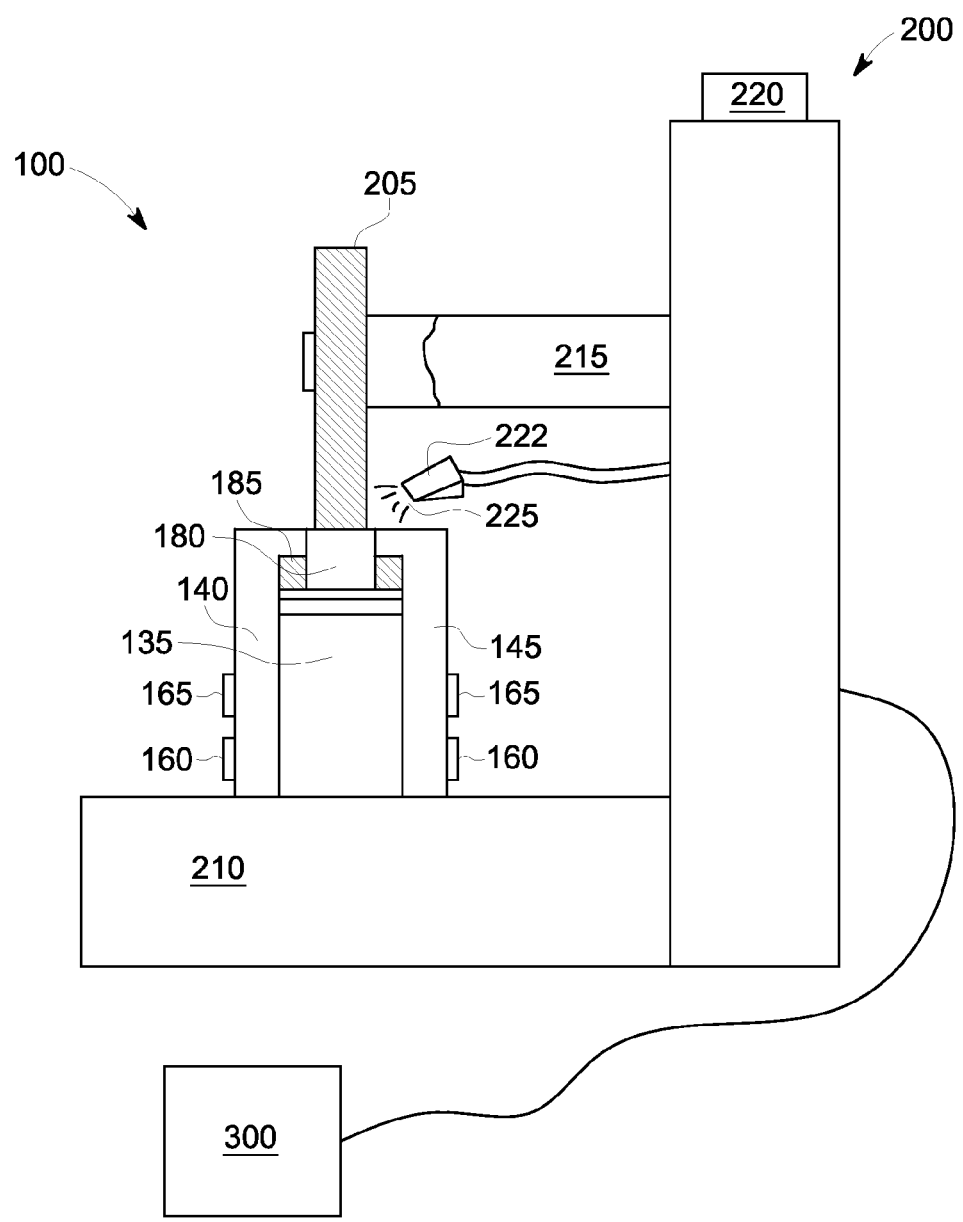
FIG. 4 shows a side schematic view of the apparatus of FIG. 3 for abrasive electrochemical finishing of an arc flange leaf segment, in accordance with an embodiment of the present invention.

As shown in FIGS. 3 and 4, resilient clamping device 130 may include a concave support block 135 and, a removable first face plate 140 and second face plate 145. Concave support block 135 may include a top 150 which may be concave in shape so as to support arc flange leaf segment 10 and in particularly, arc flanges 15 (see FIG. 1). Concave support block 135 may also include holes (not shown as the foregoing securing members are occupying them) to receive securing members. Securing members may include clamping screws 160, shoulder screws 165, and a dowel pin 170. Clamping screws 160 and shoulder screws 165 may be used to clamp removable first and second face plates 140 and 145 to concave support block 135 with arc flange leaf segment 10 secured therein. Dowel pin 170 may be used to locate and orient removable first and second face plates 140 and 145, and concave support block 135, i.e., locate a point or hole on concave support block 135, and align/accurately position concave support block 135 in reference to removable first and second face plates 140 and 145.

Non-solid clamping device 130 may also include end blocks 175 and 180. End blocks 175 and 180 may be removable and may be configured to sit at opposite ends of support block 135. End blocks 175 and 180, through the use of shoulder screws 165, may assist in constraining arc flange leaf segment 10 by securing a first leaf and a last leaf (not shown) of arc flange leaf segment 10 respectively.

As shown in FIG. 4, resilient clamping device 130 may additionally include a region of space 185 configured to contain soft materials therein. The soft materials may include rubber, a polymer, a foam, and combinations thereof. Region of space 185 may be defined and located between first and second face plates 140 and 145, first and second end blocks 175 and 180, and concave support block 135. Portions of end block 180 have been removed to show region of space 185.

Figure 5:
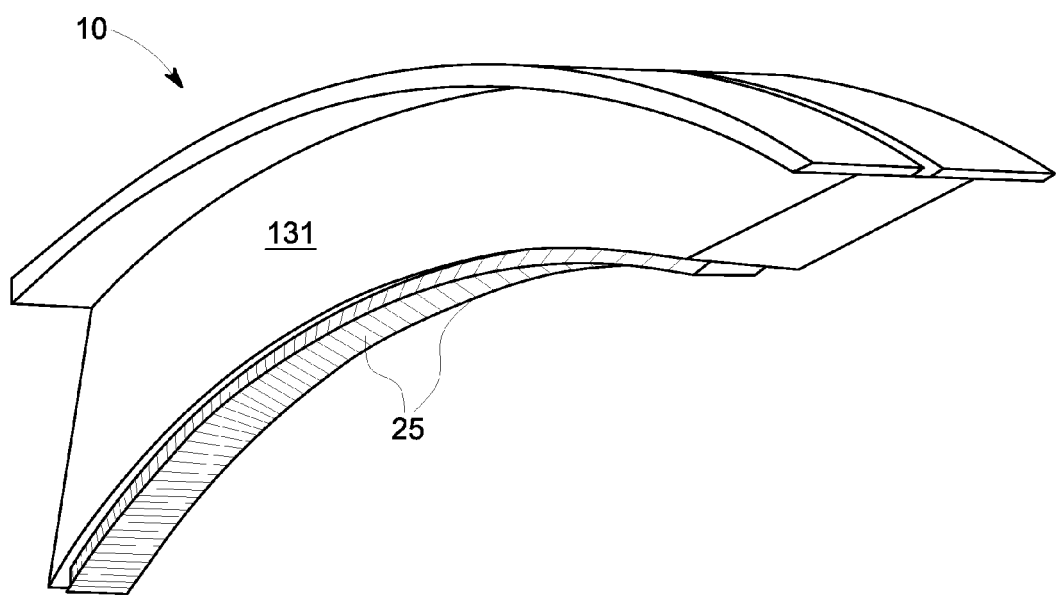
FIG. 5 shows another schematic view of an arc flange leaf pack in accordance with an embodiment of the present invention.

As shown in FIG. 5, resilient clamping device 130 may further include a brace 131. Brace 131 may be used to secure leaf segment 20 therein. Brace 131 may molded around leaves 25 using a polymer material. The polymer material may include engineering plastics, composite fiber glasses, and polymer tapes. The aforementioned are known in the art. Brace 131 having leaves 25 of arc flange leaf segment 10 secured therein may fit into region of space 185 (see also FIG. 4). Direct clamping of arc flange leaf segment 10, and in particular, leaves 25 may be avoided and thus, deformation of leaves 25 due to solid clamping is minimized.

Figure 6:
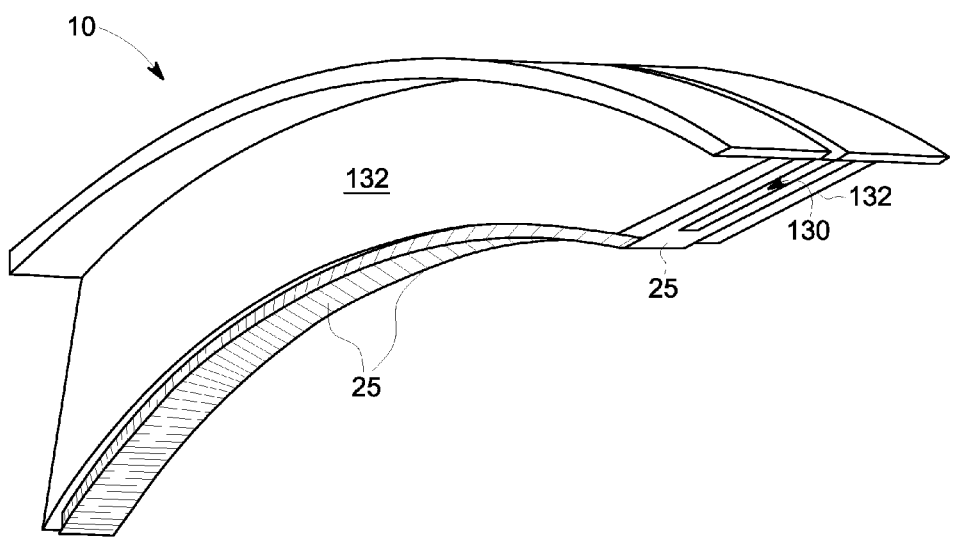
FIG. 6 shows another schematic view of an arc flange leaf pack in accordance with an embodiment of the present invention.

As shown in FIG. 6, resilient clamping device 130 may further include stabilizing plates. Stabilizing plates 132 may be used to secure leaf segment 20 therein. Stabilizing plates 132 may be manually placed or using automation on each opposite sides of leaf segment 20. Stabilizing plates 132 may include a polymer based adhesive (not shown) on the inside of each stabilizing plate 132 so as to adhere them to leaf segment 20. Polymer based adhesives are known in the art but a non-limiting example may be RP Gel made by Adhesive Systems, Inc. Stabilizing plates 132 having leaves 25 of arc flange leaf segment 10 secured therein may fit into region of space 185 (see also FIG. 4). Direct clamping of arc flange leaf segment 10, and in particular, leaves 25 may be avoided and thus, deformation of leaves 25 due to solid clamping is minimized.

In another embodiment, adhesive tape (not shown) may be applied to leaves 25 binding them without aggressively pressing against leaves 25. Examples of the adhesive tape may include polymer tapes, fiber glass composite tapes, and tough paper tapes with adhesive backing. The aforementioned are known in the art. The adhesive tape may be applied by manually wrapping the adhesive tape around leaves 25 or using automated machines to do the same. In an embodiment, adhesive tape having a length of approximately 50 cm to approximately 500 cm may be used to bind leaves 25. In another embodiment, a length of approximately 150 cm may used to bind leaves 25. In an embodiment, multiple layers of adhesive tape may be used to bind leaves 25. The use of adhesive tape may also prevent leaves 25 from flopping around, i.e., changing orientation when a conductive grinding wheel 205 (see FIG. 3) is in contact with leaves 25 and in particular, leaf tips 65. The adhesive tape may be removed after finishing without stressing leaves 25.

As shown in FIG. 4, apparatus 100 may also include an electrochemical grinding machine 200 for finishing arc flange leaf segment 10. Electrochemical grinding machine 200 may include conductive grinding wheel 205, a base (not shown) for supporting a table 210, a tool arm 215 connected to a servo motor 220 and to conductive grinding wheel 205, and a nozzle 222 for directing an electrolyte solution 225 at a work space adjacent to conductive grinding wheel 205 and leaf tips 65. Electrolyte solution 225 may also be directed to conductive grinding wheel 205, which may bring electrolyte solution 225 between conductive grinding wheel 205 and leaf tip 65. The aforementioned elements are just but a few that comprise electrochemical grinding machine 200. Electrochemical grinding machines used for electrochemical machining/finishing are known in the art and one having ordinary skill in the art of electrochemical machining will recognize without any undue experimentation any additional elements not named herein that may be used for abrasive electrochemical finishing of arc flange leaf segment 10.

As shown in FIG. 4, apparatus 100 may additionally include a control system 300 operably coupled to electrochemical grinding machine 200 for controlling finishing of arc flange leaf segment 10. Control system 300 may be mechanically or electrically connected to electrochemical grinding machine 200 such that control system 300 may actuate electrochemical grinding machine 200. Control system 300 may actuate electrochemical grinding machine 200, for example, in response to an amount of material trimmed from leaf tips 65 of arc flange leaf segment 10. Control system 300 may be computerized with electro-mechanical devices capable of actuating electrochemical grinding machine 200 and in particular, conductive grinding wheel 205 and/or table 210 to generate a 2-dimensional circular trajectory.

In an embodiment control system 300 may be a computerized device capable of providing operating instructions to electrochemical grinding machine 200. For example, control system 300 may monitor a cutting depth of leaf tips 65 and provide operating instructions to electrochemical grinding machine 200 regarding additional finishing of leaf tips 65.

In an embodiment, a button or a key of control system 300 may be mechanically linked to electrochemical grinding machine 200, such that pushing the button or turning the key causes the electrochemical grinding machine 200 to fully actuate (e.g., by moving conductive grinding wheel 205 in an arc trajectory and/or up and down along a Z direction). In another embodiment, control system 300 may be an electro-mechanical device capable of electrically monitoring (e.g., with sensors) parameters indicating the length of leaf tips 65 and mechanically actuating electrochemical grinding machine 200. While described in embodiments herein, control system 300 may actuate electrochemical grinding machine 200 through any other conventional means.

Figure 7:
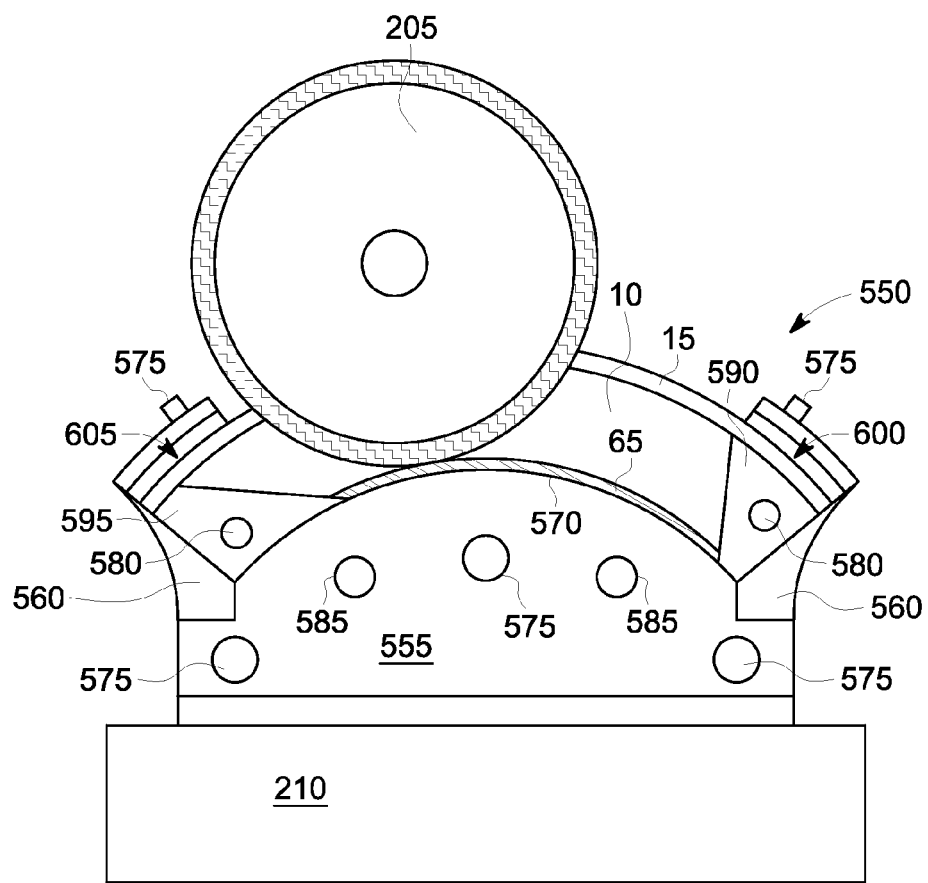
FIG. 7 shows a partial, cross-sectional schematic view of another device for non-solid clamping of an arc flange leaf segment, in accordance with an embodiment of the present invention.
Figure 8:
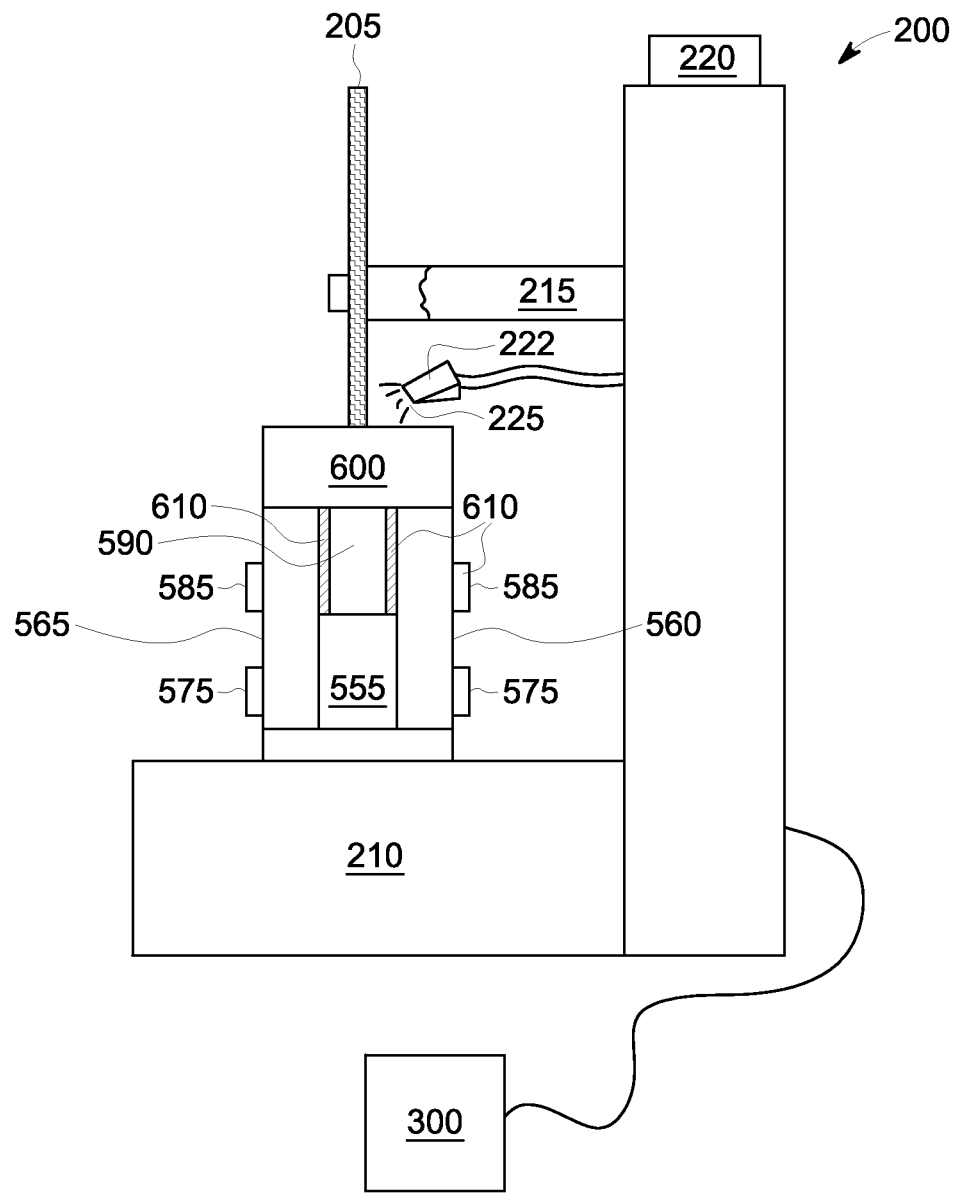
FIG. 8 shows a side schematic view of the device of FIG. 7 for non-solid clamping of the arc flange leaf segment, in accordance with an embodiment of the present invention.

Apparatus 100 may additionally comprise a second resilient clamping device for arc flange leaf segment 10. Referring to FIGS. 7 and 8, a partial, cross-sectional view and side view illustration of a second resilient clamping device 550 for securing arc flange leaf segment 10 are shown according to an embodiment of the present invention. Second resilient clamping device 550 is shown having arc flange leaf segment 10 constrained therein. Various embodiments of arc flange leaf segment 10 and electrochemical grinding machine 200 have been previously described herein.

As shown in FIGS. 7 and 8, second resilient clamping device 550 may include a convex support block 555 and, a removable first face plate 560 and second face plate 565 (see in particular FIG. 8). Convex support block 555 includes a top 570 which may be convex in shape so as to support arc flange leaf segment 10 and in particularly, leaf tips 65. Convex support block 555 also includes holes (not shown as they are occupied by securing members) to receive securing members. Securing members may include clamping screws 575, shoulder screws 580, and dowel pins 585. Clamping screws 575 may be used to clamp removable first and second face plates 560 and 565 to convex support block 555 with arc flange leaf pack 10 secured therein. Dowel pins 585 may be used to locate and orient removable first and second face plates 560 and 565, and convex support block 555, i.e., locate a point or hole on convex support block 555, and align/accurately position convex support block 555 in reference to removable first and second face plates 560 and 565.

Second resilient clamping device 550 may also include end blocks 590 and 595. End blocks 590 and 595 may be removable and may be configured to sit at opposite ends of support block 555. End blocks 590 and 595 through the use of shoulder screws 580 may assist in constraining arc flange leaf segment 10 by securing a first leaf and a last leaf (not shown)

of arc flange leaf segment 10 respectively. End blocks 590 and 595 may additionally assist in constraining arc flange leaf segment 10 as an inside surface 17 of arc flanges 15 (see also FIG. 1) rest on end blocks 590 and 595.

Second resilient clamping device 550 may additionally include cover plates 600 and 605. Cover plates 600 and 605 may also assist in constraining arc flange leaf pack 10 through the use of clamping screws 575 that screw through cover plates 600 and arc flanges 15 into end blocks 590 and 595. Clamping screws 575 use threads (not shown) in arc flanges 15 (see also FIG. 1).

As shown in FIG. 8, second resilient clamping device 550 may additionally include a region of space 610 configured to contain soft materials therein. The soft materials may include rubber, a polymer, a foam, and combinations thereof. The region of space 610 may be defined and located between first and second face plates 560 and 565, first and second end blocks 590 and 595, and convex support block 555. Portions of end block 590 have been cut away to show region of space 610.

Second resilient clamping device 550 may further include a brace 131. As shown in FIG. 5, brace 131 may be used to secure leaf segment 20 therein. Second resilient clamping device 550 may further include stabilizing plates 132. As shown in FIG. 6, stabilizing plates 132 may be used to secure leaf segment 20 therein. Second resilient clamping device 550 may further include adhesive tape (not shown) that may be applied to leaves 25 binding them without aggressively pressing against leaves 25. Arc flange leaf segment 10 having any one of brace 131, stabilizing plates 132, or the adhesive tape may fit into region of space 610 (see FIG. 8). Various embodiments of brace 131, stabilizing plates 132, and the adhesive tape have been previously described.

In another embodiment of apparatus 100 for abrasive electrochemical finishing of arc flange leaf segment 10, apparatus 100 may comprise second resilient clamping device 550 (see FIGS. 7 and 8) in lieu of resilient clamping device 130 (see FIGS. 3 and 4). Thus, apparatus 100 may include second resilient clamping device 550; electrochemical grinding machine 200 for finishing arc flange leaf segment 10; and control system 300 coupled to electrochemical grinding machine 200 and configured to control electrochemical grinding machine 200 during finishing of arch flange leaf segment 10. When apparatus 100 includes second resilient clamping device 550 in lieu of resilient clamping device 130, resilient clamping device 130 may then be viewed as an additional component.

Figure 9:
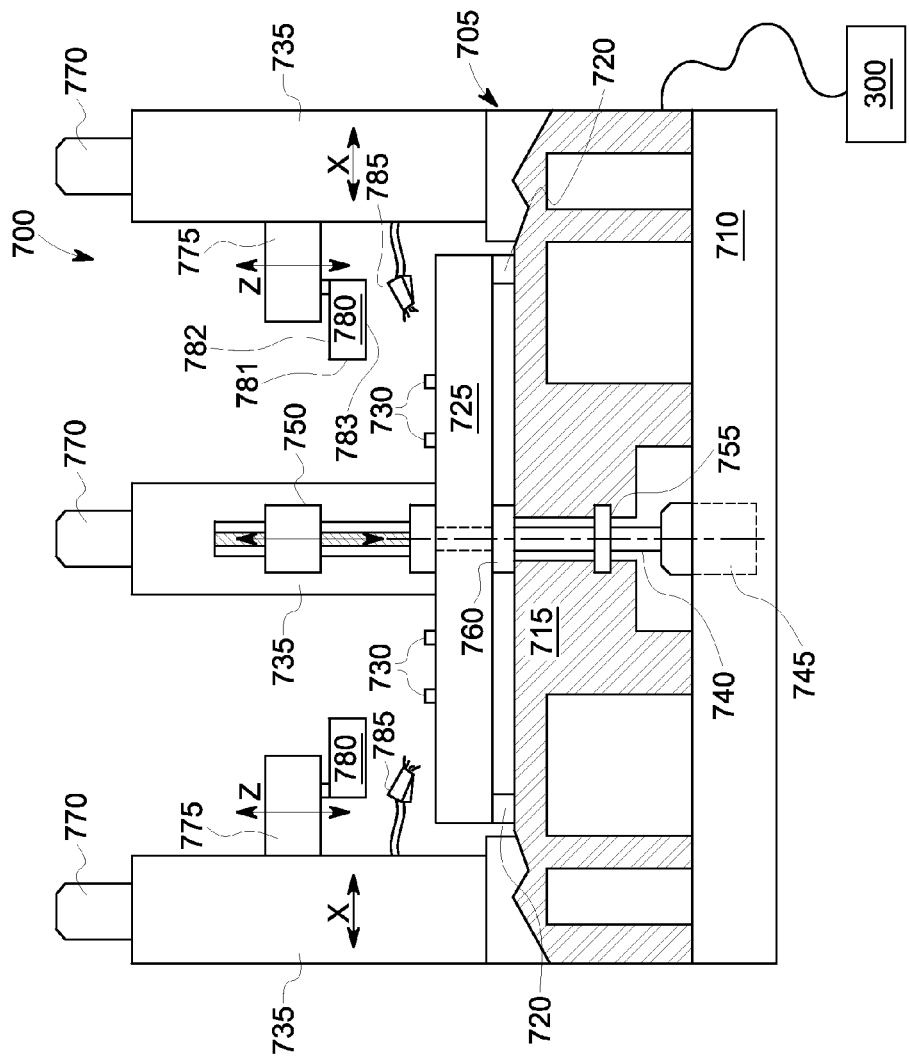
FIG. 9 shows a partial, cross-sectional schematic view of another apparatus for abrasive electrochemical finishing of an arc flange leaf segment, in accordance with an embodiment of the present invention.
Figure 10:
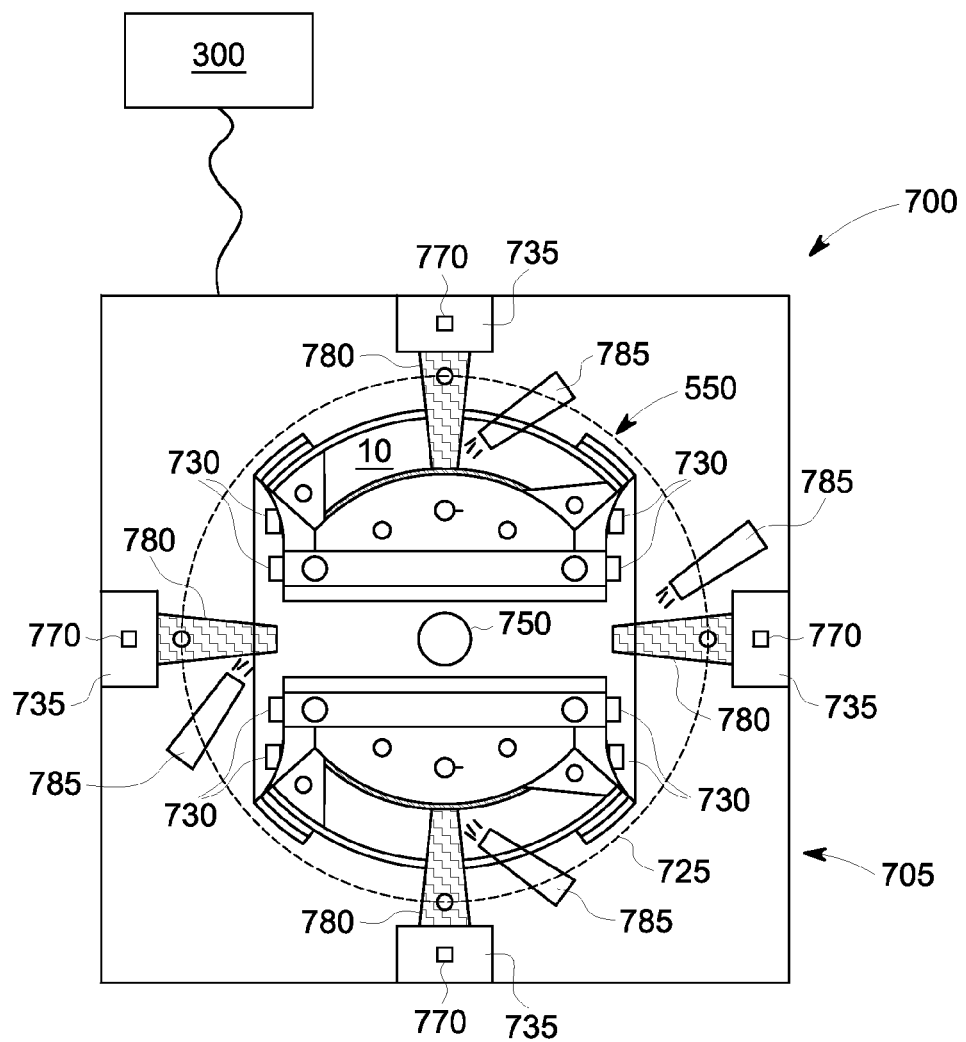
FIG. 10 shows a top-down view of the apparatus of FIG. 9 for abrasive electrochemical finishing of an arc flange leaf segment, in accordance with an embodiment of the present invention.

Referring to FIGS. 9 and 10, a partial, cross-sectional side and a top-down view illustration of an apparatus 700 for abrasive electrochemical finishing of an arc flange leaf segment 10 are shown according to an embodiment of the present invention. Apparatus 700 may include an electrochemical grinding table 705, at least one second resilient clamping device 550, and a control system 300. Also shown is arc flange leaf segment 10 constrained in second resilient clamping device 550. Various embodiments of arc flange leaf segment 10, second resilient clamping device 550, and control system 300 have been previously described herein.

As shown in FIGS. 9 and 10, electrochemical grinding table 705 may include a base 710, a supporting frame 715, circular rails 720, a rotary table 725, clamps 730, and tool columns 735. Circular rails 720 have rotary table 725 thereon so as to support a rim of rotary table 725. Rotary table 725 may spin in, e.g., a counter clockwise direction and includes clamps 730 that secure second resilient clamping device 550 to rotary table 725. Rotary table 725 may be rotated by spindle 740 which includes a spindle motor 745 for power, spindle bearing 755 for rotational support, and thrust bearing 760 to support spindle 740 rotation and support table 725.

Tool columns 735 may include a servo motor 770, a tool arm 775, a conductive grinding arm 780, a ball screw 750, and a nozzle 785. Servo motor 770 may power tool arm 775 having conductive grinding arm 780 thereon to move in a Z and/or X direction. Conductive grinding arm 780 may include a grinding tip 781, a grinding top 782, and a grinding bottom 783 all of which have abrasive grains thereon. Nozzle 785 may direct an electrolyte solution at a work location adjacent to conductive grinding arm 780 and leaf tips 65. Ball screw 750 may move power tool arm 775 in a Z direction when servo motor 770 turns.

In an embodiment, electrochemical grinding table 705 may include from approximately 1 to approximately 8 tool columns 735. Tool columns 735 may be proximate to each other at approximately 45° angles, approximately 90° angles and/or approximately 180°. For example, if electrochemical grinding table 705 includes two tool columns 735, they may be proximate to each other by approximately 180°. In another example and as shown in FIG. 9, if electrochemical grinding table 705 includes four tool columns 735, two pairs of tool columns 735 may be may be proximate to each other by approximately 180° and all four may be proximate to the other by approximately 90°. In an embodiment, rotary table 725 may be configured to hold 2 second resilient clamping devices 550 having arc flange leaf segment 10 therein. In another embodiment, rotary table 725 may be configured to hold 4 second resilient clamping devices 550 having arc flange leaf segment 10 therein. Typically, second resilient clamping devices 550 may be proximate to each other by approximately 180°.

A method for abrasive electrochemical finishing of an arc flange leaf segment is presented in accordance with an embodiment of the present invention. The method may include using an apparatus 100 to finish arc flange leaf segment 10 via abrasive electrochemical finishing. Various embodiments of arc flange leaf segment 10 and apparatus 100 have been previously described herein.

As shown in FIGS. 3 and 4, arc flange leaf segment 10 (see FIG. 1) may be constrained in a first resilient clamping device 130. Arc flanges 15 may be seated on a top 150 of concave support block 135 such that leaves 25 and in particular, leaf tips 65 are facing away from concave support block 135. Removable pairs of end blocks 175 and 180 may then be placed on a first leaf and a last leaf of leaf segment 20 respectively such that pairs of end blocks 175 and 180 may rest on a bottom surface 17 of flanges 15, contact sides of the first leaf and the last leaf of leaf segment 20, and may also contact leaf tips 65. Shoulder screws 165 may be used to secure each pair of end blocks 175 and 180.

Removable first and second face plates 140 and 145 may be placed on each side of concave support block 135, and all of the aforementioned may be oriented with each other and arc flange leaf segment 10 via dowel pin 170. Then clamping screws 160 may be used to clamp removable first and second face plates 140 and 145 to concave support block 135 with arc flange leaf segment 10 secured within. As shown in FIG. 4, apart from arc flange leaf segment 10, the assembled structure may be symmetric and may also include a region of space 185 located between first and second face plates 140 and 145, and concave support block 135. Arc flange leaf segment 10 may be secured within region of space 185 but may not take up the entire region of space 185.

It has been discovered that an advantage that may be realized in the practice of some embodiments of a method for abrasive electrochemical finishing of arc flange leaf segment 10 described herein in is that when resilient clamping is used to constrain arc flange leaf segment 10, a change in the shape of leaf segment 20 and in particular, the shape of leaves 25 as well orientation of leaves 25 may be avoided by using soft materials to secure leaves 25.

Thus, region of space 185 may be filled with soft materials such as rubber, a polymer, and/or a foam to secure leaf pack 20. The soft materials may fill region of space 185 around leaf segment 20 to secure and limit the amount of side forces on leaf segment 20. The soft materials may also prevent leaves 25 from flopping around, i.e., changing orientation when conductive grinding wheel 205 is in contact with leaves 25 and in particular, leaf tips 65. The soft materials may be removed after finishing without stressing leaves 25.

It has been discovered that another advantage that may be realized in the practice of some embodiments of a method for abrasive electrochemical finishing of arc flange leaf segment 10 described herein in is that when resilient clamping is used to constrain arc flange leaf segment 10, a change in the shape of leaf segment 20 and in particular, the shape of leaves 25 as well orientation of leaves 25 may be avoided by using a brace 131 to secure leaves 25.

In an embodiment and as shown in FIG. 5, brace 131 may be used to secure leaf segment 20. Various embodiments of brace 131 have been previously described. Brace 131 may molded around leaves 25 by making a mold die, inserting arc flange leaf segment 10 into the mold die, filling the mold die with a preselected resin or composite material, and curing preselected resin or composite material to form brace 131 around leaves arc flange leaf segment 10. Other methods may include rapid prototyping wherein a laser scan is performed to cure the preselected resin or composite material resulting in 3-dimensional brace 131. Brace 131 having arc flange leaf segment 10 secured therein may fit into region of space 185. Direct clamping of leaves 25 may be avoided and thus, deformation of leaves 25 due to solid clamping may be minimized. After arc flange leaf segment 10 is finished, brace 131 may be removed by, for example, cutting and then opening after electrochemical finishing of leaves 25. Brace 131 may also be removed by sliding it off arc flange leaf segment 10.

It has been discovered that another advantage that may be realized in the practice of some embodiments of a method for abrasive electrochemical finishing of arc flange leaf segment 10 described herein in is that when resilient clamping is used to constrain arc flange leaf segment 10, a change in the shape of leaf segment 20 and in particular, the shape of leaves 25 as well orientation of leaves 25 may be avoided by using stabilizing plates 132 to secure leaves 25.

In an embodiment and as shown in FIG. 6, stabilizing plates 132 may be used to secure leaf segment 20. Various embodiments of stabilizing plates 132 have been previously described. Stabilizing plates 132 may be place on opposite sides of leaves 25 either manually or using automation. Stabilizing plates 132 may include a polymer based adhesive (not shown) on the inside of each stabilizing plate 132 so as to adhere them to leaf segment 20. Polymer based adhesives are known in the art but a non-limiting example may be RP Gel made by Adhesive Systems, Inc. Stabilizing plates 132 having leaves 25 of arc flange leaf segment 10 secured therein may fit into region of space 185 (see also FIG. 4). Direct clamping of leaves 25 may be avoided and thus, deformation of leaves 25 due to solid clamping may be minimized. After arc flange leaf segment 10 is finished, stabilizing plates 132 may be removed by, for example, dissolving the polymer based adhesive and then separating stabilizing plates 132 from leaves 25. Stabilizing plates 132 may also be removed by sliding them off arc flange leaf segment 10.

It has been discovered that another advantage that may be realized in the practice of some embodiments of a method for abrasive electrochemical finishing of arc flange leaf segment 10 described herein in is that when resilient clamping is used to constrain arc flange leaf segment 10, a change in the shape of leaf segment 20 and in particular, the shape of leaves 25 as well orientation of leaves 25 may be avoided by using adhesive tape to secure leaves 25.

In an embodiment, adhesive tape may be applied to leaves 25 binding them without aggressively pressing against leaves 25. Various embodiments of the adhesive tape have been previously described. The adhesive tape may be applied by manually wrapping the adhesive tape around leaves 25 or using automated machines to do the same. In an embodiment, adhesive tape having a length of approximately 50 cm to approximately 500 cm may be used to bind leaves 25. In another embodiment, a length of approximately 150 cm may used to bind leaves 25. In an embodiment, multiple layers of adhesive tape may be used to bind leaves 25. The use of adhesive tape may also prevent leaves 25 from flopping around, i.e., changing orientation when conductive grinding wheel 205 is in contact with leaves 25 and in particular, leaf tips 65. The adhesive tape may be removed after finishing without stressing leaves 25.

As shown in FIGS. 3 and 4, after arc flange leaf segment 10 has been constrained in first resilient clamping device 130, arc flange leaf segment 10 may be finished using a grinding table 200. First resilient clamping device 130 with arc flange leaf segment 10 therein may be secured on a table 210.

Figure 11:
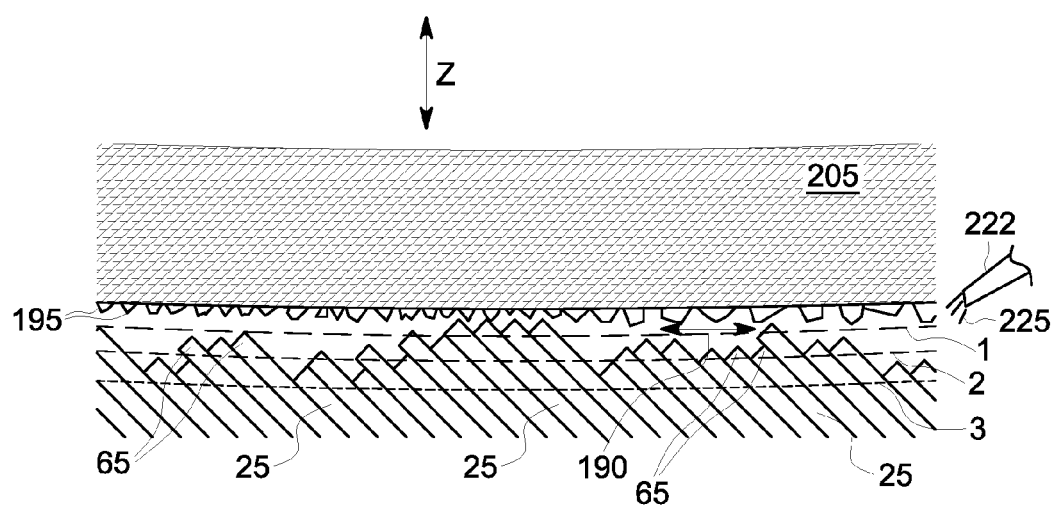
FIG. 11 shows a close-up, side view of abrasive electrochemical finishing of an arc flange leaf segment, in accordance with an embodiment of the present invention.

Referring to FIG. 11, a close up, side view of abrasive electrochemical finishing of arc flange leaf pack 10 is shown, in accordance with an embodiment of the present invention. As shown in FIG. 11, a nozzle 222 may inject an electrolyte solution 225 into a work space 190 between abrasive grains 195 and leaf tips 65 concurrent with rotation of conductive grinding wheel 205. In an embodiment, conductive grinding wheel 205 may have a negative charge via a connection to a cathode (not shown) and leaf segment 20 may have a positive charge via a connection to an anode (not shown). Additionally, conductive grinding wheel 205 may rotate, e.g., clockwise at speed of approximately 200 rotations per minute (rpm) to 8,000 rpm to bring an ample amount of electrolyte solution 225 into work space 190 and to push leaves 25 down when abrasive grains 195 engage leaves 25. Additionally, conductive grinding wheel 205 may move in a Z direction in relation to the surface of leaf segment 20 via tool arm 215 (see FIGS. 3 and 4).

As shown in FIGS. 3 and 11, conductive grinding wheel 205 may move in an X direction to finish leaf tips 65. Movement in the X direction may also push leaves 25 down to prevent leaves 25 from being pulled up in a Z direction and subsequently jamming conductive grinding wheel 205. Grinding table 210 may move resilient clamping device 130 with arc flange leaf segment 10 therein in an X direction. Movement typically occurs from right to left so as to prevent leaves 25 from being pulled up and jamming conductive grinding wheel 205. Clock-wise rotation of conductive grinding wheel 205 may prevent the same. Electrolyte solution 225 may include a salt solution of sodium nitrate and/or sodium chloride.

The mechanism of electrolytic dissolution is known in the art. As shown in FIG. 11 and without being held to any particular theory, electrolytic dissolution via contact of electrolyte solution 225 with leaf tips 65 may be the main mechanism of trimming leaf tips 65. Contact of abrasive grains 195 with leaf tips 65 may also physically cut a minimal amount of metal from leaf tips 65 and may be considered an additional mechanism of finishing leaf tips 65. Electrolytic dissolution may remove more metal from leaf tip 65 peaks than the lower leaf tip 65 peaks so as to flatten the surfaces of leaf tips 65 and result in the formation of oxide on the surface of leaf tips 65. Contact of abrasive grains 195 with leaf tips 65 having surface oxide thereon may remove the surface oxide allowing electrolyte solution 225 to further erode the newly exposed leaf tips 65. The interaction between abrasive grains 195 and leaves 25 may be small enough to remove surface oxide without exerting high mechanical force on leaf tips 65 to cause damage to leaf tips 65 or to deform leaf tips 65. Leaf tips 65 deformation under conductive grinding wheel 205 pressure may be minimized for high finishing accuracy. The surface oxide may be filtered out after electrolyte solution 225 flows back to an electrolyte tank (not shown).

While under low pressure caused by abrasive grains 195 and electrolyte solution 225, adjacent leaves 25 may aid in preventing leaf tips 65 from swinging back and forth during electrolytic dissolution. However, if a surface of leaf segment 20, i.e., leaf tips 65, are wavy and/or uneven, cusps of leaf tips 65 may tend to yield and bend down a little bit under the low pressure but may spring back up after conductive grinding wheel 205 has passed. Thus, multiple passes of conductive grinding wheel 205 may be performed to finish leaf segment 20. For example, a first pass 1 in the Z direction may be performed to remove a portion of leaf tips 65. Then a second pass 2 also may be performed where conductive grinding wheel 205 may be applied to compensate for leaves 25 springing back after conductive grinding wheel 205 has passed to further remove uneven leaf tips 65. And finally, a third pass 3 may be made to flatten the surface of leaf segment 20, i.e., make all leaf tips 65 of leaves 25 even. Jointly, the two mechanisms of electrolytic dissolution and physical grinding of leaf tips 65 may be referred to as abrasive electrochemical finishing in an embodiment of the present invention.

As shown in FIG. 4, control system 300 may be coupled to electrochemical grinding machine 200 so as to control grinding machine 200 and in particular, conductive grinding wheel 205 and table 210. Control system 300 may execute a program which determines the rate of rotation and direction of movement of conductive grinding wheel 205, movement of table 210, amount of electrolyte solution 225 injected by nozzle 222, and any other parameters typically used to perform abrasive electrochemical finishing of leaf segment 20 (see FIG. 1). Additionally, control system 300 may generate and execute instructions for determining a trajectory of conductive grinding wheel 205 according to the amount of leaf tips 65 (see FIG. 3) needed to be removed. For example, the trajectory may be a partial circular motion of conductive grinding wheel 205. In another example, conductive grinding wheel 205 may be rotated faster or slower under certain operating conditions.

As shown in FIG. 11, abrasive electrochemical finishing may remove a predetermined amount from leaf tips 65 to reach a cutting depth per pass. The cutting depth may be determined by a formula: cutting depth=final position of abrasive grains 195+electrolytic dissolution overcut. In an embodiment, approximately 0.01 mm to approximately 0.65 mm may be trimmed off of leaf tips 65 per pass of conductive grinding wheel 205. The total amount that may be removed from leaf tips 65 may be determined by a user and may be proportional to the number of passes made by conductive grinding wheel 205 to reach a target dimension.

It has been discovered that an advantage that may be realized in the practice of some embodiments of a method of abrasive electrochemical finishing described herein is that when electrolytic dissolution and physical grinding of leaf tips of arc flange leaf segment 10 are jointly used, an amount of leaf tip 65 that may be removed from corresponding leaves may fall within a user defined, narrow, and repeatable range, or tolerance.

After arc flange leaf segment 10 and in particular, leaf tips 65 have been finished, arc flange leaf segment 10 may be removed from first resilient clamping device 130 and secured in second resilient clamping device 550.

As shown in FIGS. 7 and 8, removable pairs of end blocks 590 and 595 may then be placed on opposite ends of convex support block 555. Then arc flange leaf segment 10 may be placed in removable end blocks 590 and 595 such that the first leaf and the last leaf of leaf segment 20 are constrained in removable end blocks 590 and 595 respectively, and such that leaves 25 and in particular, leaf tips 65 are facing toward and contacting a top 570 of convex support block 555. The contact force between leaf tips 65 and top 570 may be just light enough to assist in limiting leaf tips 65 from moving during the abrasive electrochemical finishing.

Cover plates 600 and 605 may then be screwed into end blocks 590 and 595 respectively using clamping screws 575 to secure end blocks 590 and 595 to arc flanges 15. First and second face plates 560 and 565 may be placed on each side of convex support block 555 and the aforementioned may be oriented with each other using dowel pins 585. Then clamping screws 575 may be used to clamp first and second face plates 560 and 565 with convex support block 555, and to form a region of space 610. Leaf segment 20 may be secured within region of space 610 but may not take up the entire region of space 610.

As shown in FIG. 8, region of space 610 then may be filled with soft materials such as but not limited to a rubber, a polymer, and/or a foam. The soft materials may fill region of space 610 around leaf segment 20 to secure and limit the amount of side forces on leaf segment 20. The soft materials may also prevent leaves 25 from flopping around, i.e., changing orientation when conductive grinding wheel 205 is in contact with leaves 25 and in particular, leaf tips 65.

As shown in FIG. 5 and in another embodiment, brace 131 may be used to secure leaf segment 20. In another embodiment and as shown in FIG. 6, stabilizing plates 132 may be used to secure leaf segment 20. In another embodiment, adhesive tape (not shown) may be applied to leaves 25 binding them without aggressively pressing against leaves 25. Various embodiments of brace 131, stabilizing plates 132, and the adhesive tape, and methods of use have been previously described.

As shown in FIGS. 7 and 8, after arc flange leaf segment 10 has been constrained in second resilient clamping device 550, arc flange leaf segment 10 may be finished using a grinding table 200. Second resilient clamping device 550 with arc flange leaf segment 10 therein may be secured on a table 210.

Figure 12:
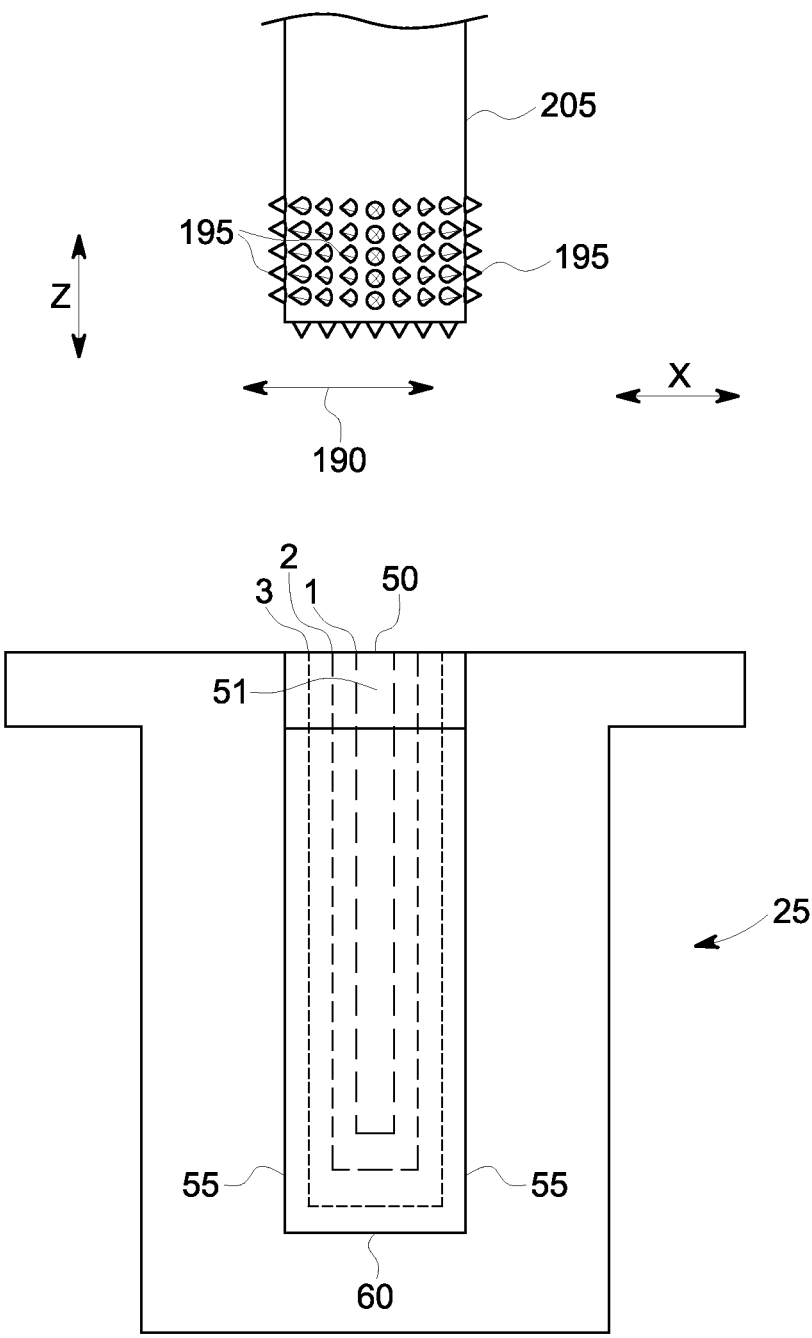
FIG. 12 shows a partial, cross-sectional schematic view of abrasive electrochemical finishing of an arc flange leaf segment, in accordance with an embodiment of the present invention.

Referring to FIG. 12, another close up, partial, cross-sectional schematic view of abrasive electrochemical finishing of arc flange leaf segment 10 is shown, in accordance with an embodiment of the present invention. Nozzle 222 may inject an electrolyte solution 225 into a work space 190 between abrasive grains 195 and a portion 51 of a top 50 of leaf 25 concurrent with rotation of conductive grinding wheel 205. Various embodiments of conductive grinding wheel 205 and electrolyte solution 225 have been previously described herein. Conductive grinding wheel 205 may rotate clockwise to bring an ample amount of electrolyte solution 225 into work space 190 and move in a Z direction so as to cut through portion 51 of top 50 above a leaf slot 30. Table 210 (see FIGS. 7 and 8) may also move second resilient clamping device 550 with arc flange leaf segment 10 therein in an X direction. Movement typically occurs from left to right.

The mechanism of electrolytic dissolution is known in the art. Without being held to any particular theory, electrolytic dissolution via contact of electrolyte solution 225 with leaf slot sides 55 and leaf slot bottom 60 may be the main mechanism of finishing leaf slot 30. Contact of abrasive grains 195 with portion 51 of top 50 may physically grind and cut through portion 51. The main mechanism for penetrating portion 51 of top 50 may attributed to electrochemical grinding.

As shown in FIG. 12, leaf slot sides 55 and leaf slot bottom 60 may be finished by removing a minimal amount of metal from the aforementioned. Electrolytic dissolution may remove metal from leaf slot sides 55 and leaf slot bottom 60, and result in the formation of surface oxide. Contact of abrasive grains 195 with leaf slot sides 55 and leaf slot bottom 60 surface oxide thereon may remove the surface oxide allowing electrolyte solution 225 to further erode the newly exposed leaf slot sides 55 and leaf slot bottom 60. The interaction between abrasive grains 195, and leaf slot sides 55 and leaf slot bottom 60 may be small enough to remove surface oxide without exerting high mechanical force on leaf slot sides 55 and leaf slot bottom 60 to cause damage to the aforementioned or deform leaf tips 65. Deformation of leaves 65 under conductive grinding wheel 205 pressure may be minimized for high finishing accuracy. The surface oxide may be filtered out after electrolyte solution 225 flows back to an electrolyte tank (not shown).

Multiple passes of conductive grinding wheel 205 may be performed to finish leaf segment 20. For example, a first pass 1 in the X direction may be performed to remove a portion of one side of leaf slot sides 55. Then a second pass 2 also may be performed where conductive grinding wheel 205 may be fed deeper into leaf slot side 55 in the Z direction and the X direction to further remove metal from one side of leaf slot sides 55. And finally, a third pass 3 may be made to remove a last amount of one side of leaf slot sides 55. The aforementioned steps may be used to finish the other side of leaf slot sides 55 as well as leaf slot bottom 60.

Figure 13:
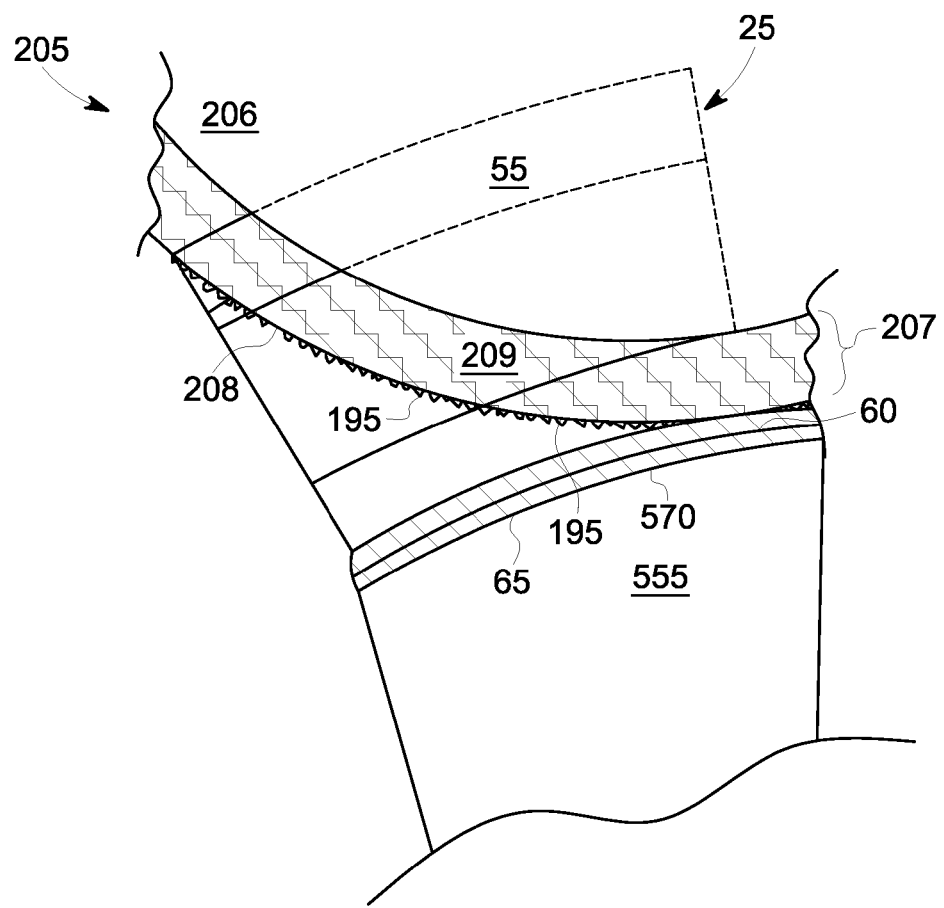
FIG. 13 shows another close-up, partial, cross-sectional schematic view of abrasive electrochemical finishing of an arc flange leaf segment, in accordance with an embodiment of the present invention.

Referring to FIG. 13, a close up, side schematic view of abrasive electrochemical finishing of arc flange leaf segment 10 is shown, in accordance with an embodiment of the present invention. As shown in FIG. 13, a portion of conductive grinding wheel 205 is shown having a recessed hub 206 and a rim 207. Rim 207 may include an outer rim 208 that may be on an outside circumference of conductive grinding wheel 205 and a rim area 209 on the side of conductive grinding wheel 205. Each may have abrasive grains 195 on thereon. Also shown is a portion of leaf segment 20 including a leaf 25, one slot side of slot sides 55, slot bottom 60, and a leaf tip 65, and a portion of top 570 convex support block 555 supporting leaf segment 20.

Hub 206 may be recessed and void of any abrasive grains 195 so that the abrasive grains on rim 207 may have clearance with leaf slot 30 as conductive grinding wheel 205 goes further down into the leaf slot. As a result of the lack of abrasive grains 195, hub 206 may not have any electrical conductivity and thus, the area defined by hub 206 may not be effective for electrolytic dissolution. Rim 207 on the other hand may be effective for cutting through slot sides 55 via electrolytic dissolution and with a small amount of shallow grinding, i.e., via abrasive electrochemical finishing. Finished leaf slot sides 55 may be substantially parallel to each other. In another embodiment, finished leaf slot sides 55 may be substantially non-parallel to each other and the leaf slot may substantially have the shape of an inverted trapezoid. The electrolytic reaction between rim 207 and slot sides 55 may be increased with an increase in rim area 209.

Various embodiments of control system 300 have been previously described herein. Additionally, control system 300 may generate and execute instructions for determining a trajectory of conductive grinding wheel 205 according to the amount of metal on top 50 needed to be grinded through portion 51 and the amount of metal need to be removed from leaf slot sides 55 and leaf slot bottom 60. For example, the trajectory of conductive grinding wheel 205 may be a partial circular motion.

Still referring to FIG. 13, abrasive electrochemical finishing may remove a predetermined amount from leaf slot sides 55 and leaf slot bottom 60. In an embodiment, approximately 0.01 mm to approximately 0.1 mm may be removed from leaf slot sides 55 and approximately 0.01 mm to approximately 0.8 mm may be removed from leaf slot bottom 60 per pass of conductive grinding wheel 205.

It has been discovered that an advantage that may be realized in the practice of some embodiments of a method of abrasive electrochemical finishing described herein is that when electrolytic dissolution and shallow grinding of leaf sides 55 and leaf bottom 60 of arc flange leaf segment 10 are jointly used, an amount of metal from leaf slot sides 55 and leaf slot bottom 60 that may be removed from leaf slot 30 may fall within a user defined, narrow, and repeatable range.

After leaf slot sides 55 and leaf slot bottom 60 have been finished, second resilient clamping device 550 may be removed from electrochemical grinding machine 200 and subsequently, arc flange leaf segment 10 may be removed from second resilient clamping device 550 resulting in arc flange leaf segment 10 having been finished via abrasive electrochemical finishing.

Another method for abrasive electrochemical finishing of an arc flange leaf segment is presented in accordance with an embodiment of the present invention. The method may include using an apparatus 100 and an apparatus 700 to finish arc flange leaf segment 10 via abrasive electrochemical finishing. Various embodiments of apparatus 100 and apparatus 700 have been previously described herein. In an embodiment, apparatus 700 may include an electrochemical grinding table 705, at least 1 second resilient clamping device 550, and a control system 300. Various embodiments of arc flange leaf segment 10, second resilient clamping device 550, and control system 300 been previously described herein.

As shown in FIGS. 3 and 4, an arc flange leaf segment 10 (see FIG. 1) may be constrained in a first resilient clamping device 130 of apparatus 100 and leaf tips 65 of arc flange leaf segment 10 may be finished using apparatus 100. Various embodiments of a method of finishing leaf tips 65 using apparatus 100 have been previously described herein. After leaf tips 65 have been finished, arc flange leaf segment 10 may be removed from first resilient clamping device 130 and secured in a second resilient clamping device 550 of apparatus 700. Various embodiments of method of securing arc flange leaf segment 10 in a second resilient clamping device 550 have been previously described herein.

As shown in FIGS. 8 and 9, after arc flange leaf segment 10 may be constrained in second resilient clamping device 550 and then may be finished using electrochemical grinding table 705 of apparatus 700. Second resilient clamping device 550 with arc flange leaf segment 10 therein may then be secured on a rotary table 725 of electrochemical grinding table 705 using rotary table clamps 730. Typically, another resilient clamping device 550 with or without another arc flange leaf segment 10 therein may be secured on rotary table 725 180° opposite to the first so as to balance rotary table 725 as it spins.

Referring to FIG. 14, another close up, side schematic view of abrasive electrochemical finishing of arc flange leaf segment 10 is shown, in accordance with an embodiment of the present invention. As shown in FIG. 14, a nozzle 785 may inject an electrolyte solution into a work space 190 between abrasive grains 195 of conductive grinding arm 780 and a portion 51 of a top 50 of leaf 25 concurrent with rotation of rotary table 725. Rotary table 725 may rotate, e.g., clockwise to bring an ample amount of electrolyte solution 225 into work space 190 and move in an X direction so as make contact with grinding tip 781 and to cut through portion 51. Rotary table 725 may also move non-solid clamping device 550 with arc flange leaf segment 10 therein in a Z direction to facilitate cutting through the entire top portion 50. Concurrent with and independent of rotary table 725 movement, conductive grinding arm 780 may also move in an X and Z direction via movement of tool arm 775 (see also FIGS. 9 and 10).

The mechanism of electrolytic dissolution is known in the art. Without being held to any particular theory, electrolytic dissolution via contact of electrolyte solution with leaf slot sides 55 and leaf slot bottom 60 may be the main mechanism of finishing leaf slot 30. Contact of abrasive grains 195 with portion 51 may physically grind and cut through portion 51 top 50. The main mechanism for penetrating the portion 51 may be attributed to electrochemical grinding.

Leaf slot sides 55 and leaf slot bottom 60 may be finished by removing a minimal amount of metal from the aforementioned. Electrolytic dissolution may remove metal from leaf slot sides 55 and leaf slot bottom 60, and result in the formation of surface oxide. Contact of abrasive grains 195 with leaf slot sides 55 and leaf slot bottom 60 surface oxide thereon may remove the surface oxide allowing electrolyte solution 225 to further erode the newly exposed leaf slot sides 55 and leaf slot bottom 60. The interaction between abrasive grains 195, and leaf slot sides 55 and leaf slot bottom 60 may be small enough to remove surface oxide without exerting high mechanical force on leaf slot sides 55 and leaf slot bottom 60 to cause damage to leaf slot 30 or deform leaf tips 65. Deformation of leaves 25 under conductive grinding wheel 205 pressure may be minimized for high finishing accuracy. The surface oxide may be filtered out after electrolyte solution flows back to an electrolyte tank (not shown).

Still referring to FIG. 14, multiple passes of rotary table 725 (see FIGS. 9 and 10) may be performed to finish leaf segment 20. For example, a first pass 1 in the X and/or Z direction may be performed to remove a portion of one side of leaf slot sides 55. Then a second pass 2 also may be performed where rotary table 725 may be fed deeper onto conductive grinding arm 780 in the X and/or Z direction such additional metal may be further removed from one side of leaf slot sides 55. And finally, a third pass 3 may be made to remove a last amount of one side of leaf slot sides 55. The aforementioned steps may be used to finish the other side of leaf slot sides 55 as well as leaf slot bottom 60.

In an embodiment, conductive grinding arm 780 may be moved in the X and/or Z direction independently of the movement of rotary table 725 having arc flange leaf segment 10 thereon. For example, a first pass 1 in the X and/or Z direction may be performed to remove a portion of one side of leaf slot sides 55 by moving conductive grinding arm 780 via tool arm 775 and a servo motor 770 of a tool column 735 (see FIGS. 9 and 10 regarding tool arm 775, servo motor 770, and tool column 735). Then a second pass 2 also may be performed where conductive grinding arm 780 may be fed deeper into leaf slot side 55 in the X direction and/or Z direction to further remove metal from one side of leaf slot sides 55. And finally, a third pass 3 may be made to a last amount of one side of leaf slot sides 55. The aforementioned steps may be used to finish the other side of leaf slot sides 55 as well as leaf slot bottom 60.

As shown in FIGS. 9 and 14, conductive grinding arm 780 may include a grinding top 782, a grinding bottom 783, and grinding tip 781 all of which may be level, i.e., there may not be any recesses thereon, and conductive grinding arm 780 may have abrasive grains 195 on the entire surface or any part of the surface that may come in contact with leaf 25. As a result of conductive grinding arm 780 having even surfaces, the entire conductive grinding arm 780 may be effective for finishing slot sides 55 with electrolytic dissolution and with a small amount of shallow grinding, i.e., via abrasive electrochemical finishing. Also, another result of conductive grinding arm 780 having level surfaces, finished leaf slot sides 55 may be substantially parallel to each other.

Embodiments of control system 300 have been previously described herein. In an embodiment, control system may be in communication with both apparatus 100 and apparatus 700 simultaneously. Additionally, control system 300 may generate and execute instructions for determining a trajectory of rotary table 725 and/or conductive grinding arm 780 according to the amount of metal on top 50 needed to be grinded and the amount of metal need to be removed from leaf slot sides 55 and leaf slot bottom 60. For example, the trajectory of conductive grinding wheel 205 may be a partial circular motion. In another example, wheel spindle 740 (see FIG. 8) may be fed faster or slower along a circular path.

Referring back to FIG. 14, abrasive electrochemical finishing may remove a predetermined amount from leaf slot sides 55 and leaf slot bottom 60. In an embodiment, approximately 0.01 mm to approximately 0.1 mm may be removed from leaf slot sides 55 and approximately 0.01 mm to approximately 0.8 mm may be removed from leaf slot bottom 60 per pass of conductive grinding wheel 205.

It has been discovered that an advantage that may be realized in the practice of some embodiments of a method of abrasive electrochemical finishing described herein is that when electrolytic dissolution and shallow grinding of leaf sides 55 and leaf bottom 60 of arc flange leaf segment 10 are jointly used, an amount of metal from leaf slot sides 55 and leaf slot bottom 60 that may be removed from leaf slot 35 may fall within a user defined, narrow, and repeatable range.

It also has been discovered that another advantage that may be realized in the practice of some embodiments of a method of abrasive electrochemical finishing described herein is that when electrolytic dissolution and shallow grinding of leaf slot sides 55 of arc flange leaf segment 10 are jointly used, leaf slot sides 55 may finished so that they are substantially parallel to each other.

In another embodiment, multiple arc flange leaf segments 10 may be finished simultaneously using apparatus 700 by securing pairs of second resilient clamping devices 550 having arc flange leaf segments 10 therein. The pairs of second resilient clamping devices 550 may be secured on rotary table 725 opposite to each other by 180° so as to maintain balance of rotary table 725 while spinning.

After leaf slot sides 55 and leaf slot bottom 60 have been finished, second resilient clamping device 550 may be removed from apparatus grinding table 705 and subsequently, arc flange leaf segment 10 may be removed from second resilient clamping device 550 resulting in arc flange leaf segments 10 having been finished via abrasive electrochemical finishing.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A resilient clamping device comprising:
   a concave support block having holes to receive securing members;
   removable first and second end blocks configured to seat at opposite ends of the concave support block;
   removable first and second face plates attached to opposite sides of the concave support block via the securing members;
   a region of space between the removable first and second face plates, the removable first and second end blocks, and the concave support block,
   wherein the region of space contains a soft material selected from the group consisting of: a rubber, a polymer, and a foam,
   a brace configured to secure leaves of an arc flange leaf segment and to fit within the region of space, wherein the brace secures along each side edge of each leaf segment,
   wherein the removable first end block is configured to secure a first leaf of the arc flange leaf segment and the removable second end block is configured to secure a last leaf of the arc flange leaf segment; and
   stabilizing plates configured to secure leaves of the arc flange leaf segment and to fit within the region of space.

2. The device according to claim 1, additionally comprising tape configured to secure leaves of an arc flange leaf segment.

3. A resilient clamping device comprising:
   a convex support block having holes to receive securing members;
   removable first and second end blocks configured to seat at opposite ends of the convex support block;
   removable first and second cover plates configured to seat on the removable first and second end blocks respectively;
   removable first and second face plates attached to opposite sides of the convex support block via the securing members;
   a region of space between the removable first and second face plates, the removable first and second end blocks, and the convex support block,
   wherein the region of space contains a soft material selected from the group consisting of: a rubber, a polymer, and a foam,
   a brace configured to secure leaves of an arc flange leaf segment and to fit within the region of space, wherein the brace secures along each side edge of each leaf segment,
   wherein the removable first end block is configured to secure a first leaf of the arc flange leaf segment and the removable second end block is configured to secure a last leaf of the arc flange leaf segment; and
   stabilizing plates configured to secure leaves of the arc flange leaf segment and to fit within the region of space.

4. The device according to claim 3, additionally comprising tape configured to secure leaves of an arc flange leaf segment and to fit within the region of space.

* * * * *